United States Patent [19]

Ambler et al.

[11] Patent Number: 5,462,135
[45] Date of Patent: Oct. 31, 1995

[54] TREE STAND

[76] Inventors: Robert D. Ambler, 1220 Plains Rd., Leslie, Mich. 49521; Rick L. Green, 5781 Kinneville Rd., Eaton Rapids, Mich. 48827

[21] Appl. No.: 269,130

[22] Filed: Jun. 30, 1994

[51] Int. Cl.⁶ .................................................. A01M 31/00
[52] U.S. Cl. ........................................... 182/187; 182/188
[58] Field of Search ...................... 182/187, 188, 182/189, 133, 134, 135, 136; 108/152, 108

[56] References Cited

U.S. PATENT DOCUMENTS

| | | | |
|---|---|---|---|
| 4,549,635 | 10/1985 | Early | 108/152 X |
| 4,579,198 | 4/1986 | Lee | 182/187 X |
| 4,603,757 | 8/1986 | Hollinger | 108/152 X |
| 4,727,961 | 3/1988 | Dawson | 108/152 X |
| 4,784,239 | 11/1988 | Kirkman | 182/187 |
| 5,060,756 | 10/1991 | D'Acquisto | 182/187 |
| 5,297,656 | 3/1994 | Amacker | 182/188 X |

*Primary Examiner*—Karen J. Chotkowski

[57] ABSTRACT

A tree stand comprising a foot rest; a back leg having a base end and a tip end with the base end coupled with the foot rest in an operable configuration and decoupled therefrom in a stowed configuration; a front leg having a base end pivotally coupled to the foot rest at a location offset from the coupling of the foot rest with the back leg and a tip end pivotally coupled to the back leg, the front leg and the back leg upwardly orientable from the foot rest in an operational configuration and proximately orientable therewith in a stowed configuration; a seat pivotally coupled to the rear leg and generally perpendicularly orientable therefrom in an operational configuration and upwardly orientable therefrom in a stowed configuration; a seat back pivotally coupled to the rear leg and generally upwardly orientable therefrom in an operational configuration and proximately orientable with the seat in a stowed configuration; and a coupling mechanism for coupling the back leg to a tree.

6 Claims, 5 Drawing Sheets

TREE STAND

BACKGROUND OF THE INVENTION

1. Field of the Invention

The present invention relates to a tree stand and more particularly pertains to providing a stationary support for use by a hunter with a tree stand.

2. Description of the Prior Art

The use of tree stands is known in the prior art. More specifically, tree stands heretofore devised and utilized for the purpose of providing a stationary support for use by a hunter are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,997,063 to Bradley discloses a collapsible and adjustable tree stand. U.S. Pat. No. 5,064,020 Eagleson discloses a device for hunting large and small game. U.S. Pat. No. 5,103,935 to Amacker discloses a tree stand with telescoping seat. U.S. Pat. No. 5,195,611 to Untz discloses a portable observation and hunting stand. U.S. Pat. No. 5,234,076 to Louke et al. discloses a tree stand.

While these devices fulfill their respective, particular objective and requirements, the aforementioned patents do not describe a tree stand that is portable in design for supporting a hunter and does not utilize support cables for holding either the foot rest or seat in an operable configuration as with most prior art designs.

In this respect, the tree stand according to the present invention substantially departs from the conventional concepts and designs of the prior art, and in doing so provides an apparatus primarily developed for the purpose of providing a stationary support for use by a hunter.

Therefore, it can be appreciated that there exists a continuing need for new and improved tree stand which can be used for providing a stationary support for use by a hunter. In this regard, the present invention substantially fulfills this need.

SUMMARY OF THE INVENTION

In the view of the foregoing disadvantages inherent in the known types of tree stands now present in the prior art, the present invention provides an improved tree stand. As such, the general purpose of the present invention, which will be described subsequently in greater detail, is to provide a new and improved tree stand and method which has all the advantages of the prior art and none of the disadvantages.

To attain this, the present invention essentially comprises, in combination, a rigid and planar foot rest for supporting a user thereon with the foot rest having a trapezoidal frame with opposed front and rear legs, opposed side legs extended inwards from the front leg to the rear leg, an intermediate leg parallely disposed between the front and rear legs and coupled to the side legs, and a grate disposed thereover. A rigid back leg is included and has a cross bar with a pair of spaced and parallel rear support bars extended therefrom and with each rear support bar terminated at a tip end. A rigid guide is included and formed of two plates. Each plate is coupled to the rear leg of the footrest at the midpoint thereof and extended upwards therefrom to form a holding space therebetween for receiving the cross bar of the back leg therein. A rigid lower pivot bolt is included and coupled in parallel with the intermediate leg of the foot rest at a location upwardly offset therefrom. A rigid upper pivot bolt is included and coupled across the rear support bars of the back leg at a location offset from the tip ends thereof. A rigid front leg is included and has a pair spaced and parallel front support bars each having a base end pivotally coupled to the lower pivot bolt and a tip end pivotally coupled to the upper pivot bolt. The front leg and the back leg are upwardly orientable from the foot rest in an operational configuration and proximately orientable therewith in a stowed configuration.

A rigid and planar seat is provided. The seat has a trapezoidal frame with opposed front and rear legs, and opposed side legs extended inwardly from the front leg to the rear leg, and a grate disposed thereover. The rear leg of the seat is pivotally coupled to the tip ends of the back leg. The seat is perpendicularly orientable from the back leg in an operational configuration and upwardly orientable therewith in a stowed configuration.

A rigid, planar, and trapezoidal seat back is provided. The seat back has opposed upper and lower edges, opposed side edges extended inwards from the upper edge to the lower edge and with the lower edge pivotally coupled to the tip ends of the back leg. The seat back includes a layer of padding disposed therearound. The seat back is upwardly orientable from the back leg in an operational configuration and proximately orientable with the seat in a stowed configuration.

Lastly, a pair of chains is included for coupling the back leg to a tree. One chain is removably secured to the guide, thereby securing the cross bar of the rear leg within the holding space of the guide in an operable configuration. The other chain is removably secured to the rear leg at a location below the seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree stand which has all the advantages of the prior art tree stands and none of the disadvantages.

It is another object of the present invention to provide a new and improved tree stand which may be easily and efficiently manufactured and marketed.

It is a further object of the present invention to provide a new and improved tree stand which is of durable and reliable construction.

An even further object of the present invention is to provide a new and improved tree stand which is susceptible of a low cost of manufacture with regard to both materials and labor, and which accordingly is then susceptible of low prices of sale to the consuming public, thereby making such a tree stand economically available to the buying public.

Still yet another object of the present invention is to provide a new and improved tree stand which provides in the apparatuses and methods of the prior art some of the advantages thereof, while simultaneously overcoming some of the disadvantages normally associated therewith.

Even still another object of the present invention is to provide a new and improved tree stand for providing a stationary support for use by a hunter.

Lastly, it is an object of the present invention to provide a new and improved tree stand comprising a foot rest; a back leg having a base end and a tip end with the base end coupled with the foot rest in an operable configuration and decoupled therefrom in a stowed configuration; a front leg having a base end pivotally coupled to the foot rest at a location offset from the coupling of the foot rest with the back leg and a tip end pivotally coupled to the back leg, the front leg and the back leg upwardly orientable from the foot rest in an operational configuration and proximately orientable therewith in a stowed configuration; a seat pivotally coupled to the rear leg and generally perpendicularly orientable therefrom in an operational configuration and upwardly orientable therefrom in a stowed configuration; a seat back pivotally coupled to the rear leg and generally upwardly orientable therefrom in an operational configuration and proximately orientable with the seat in a stowed configuration; and coupling means for coupling the back leg to a tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 2:
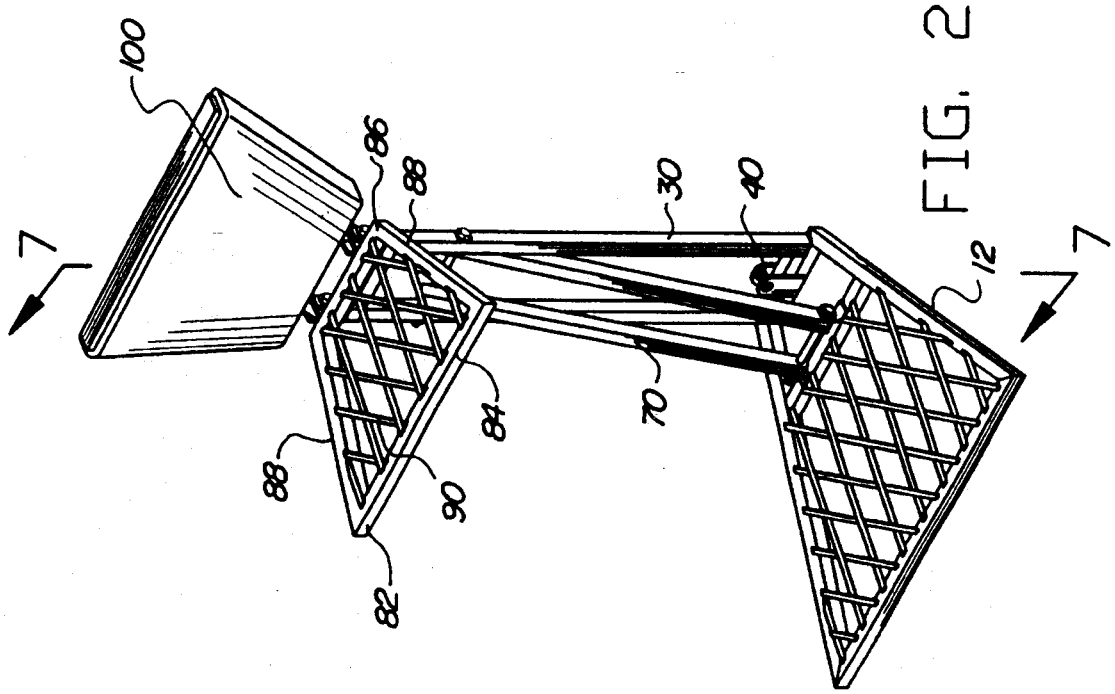
FIG. 2 is a perspective view of the preferred embodiment constructed in accordance with the principles of the present invention decoupled from a tree.
Figure 1:
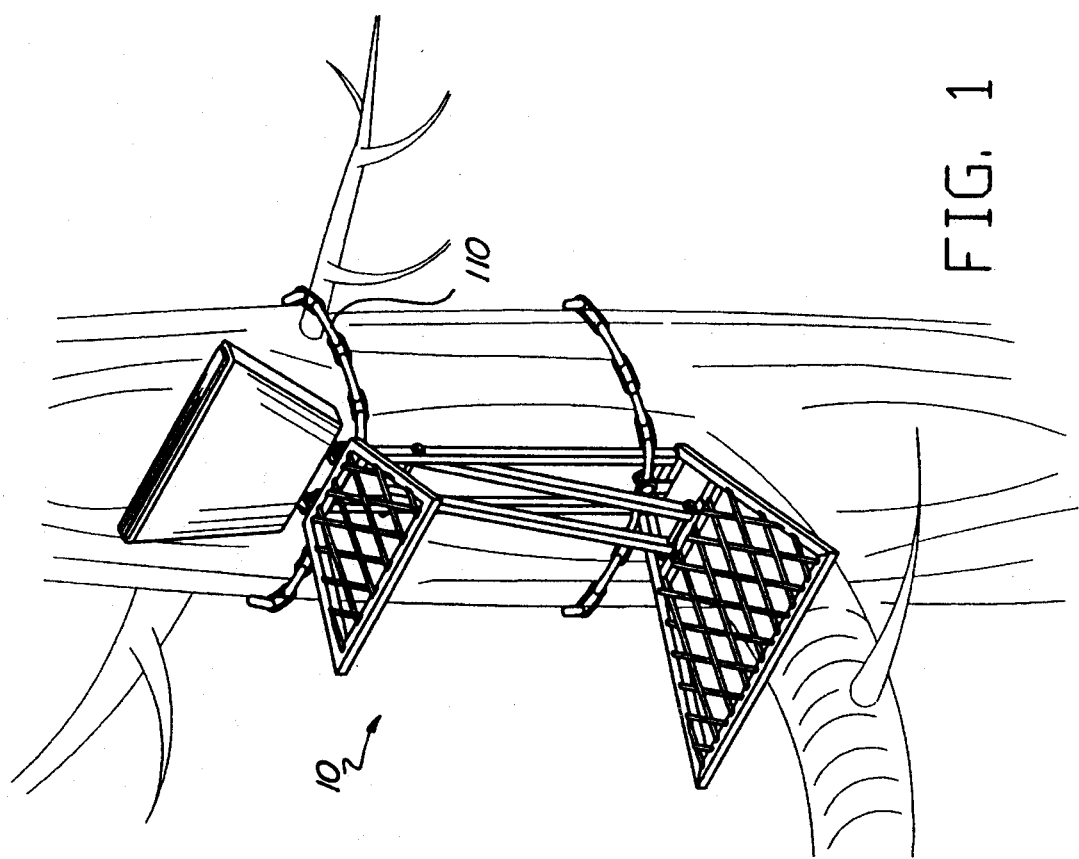
FIG. 1 is a perspective view of the preferred embodiment constructed in accordance with the principles of the present invention coupled to a tree in an operable configuration.
Figure 4:
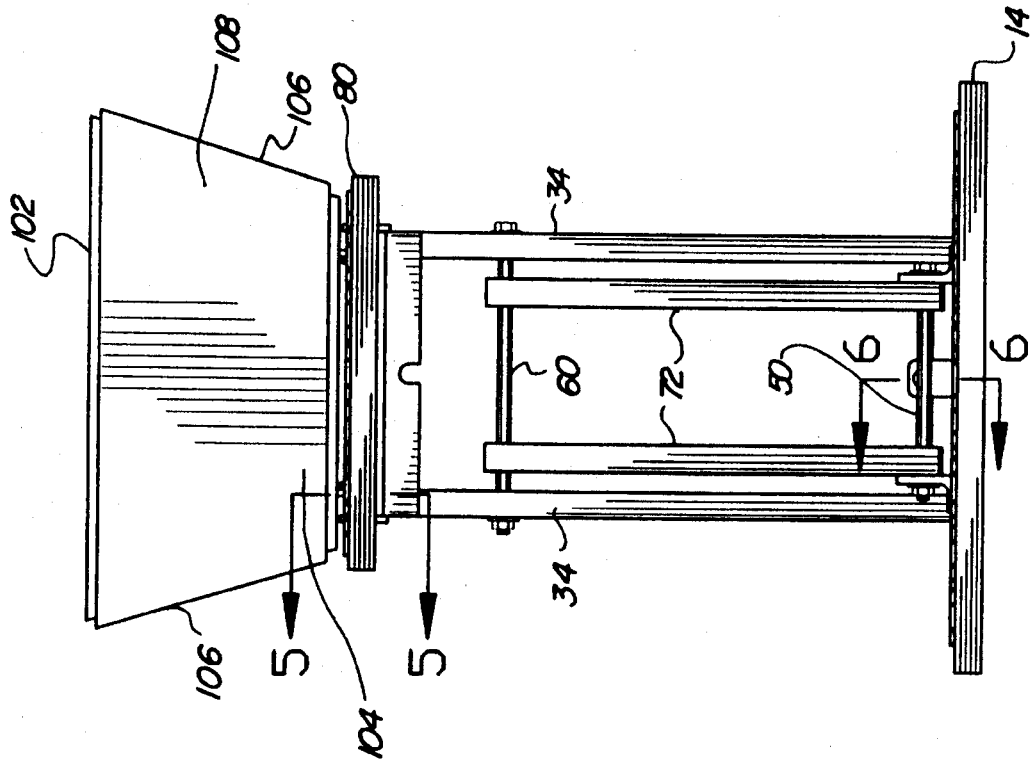
FIG. 4 is a side elevational view of the present invention in an operable configuration.
Figure 3:
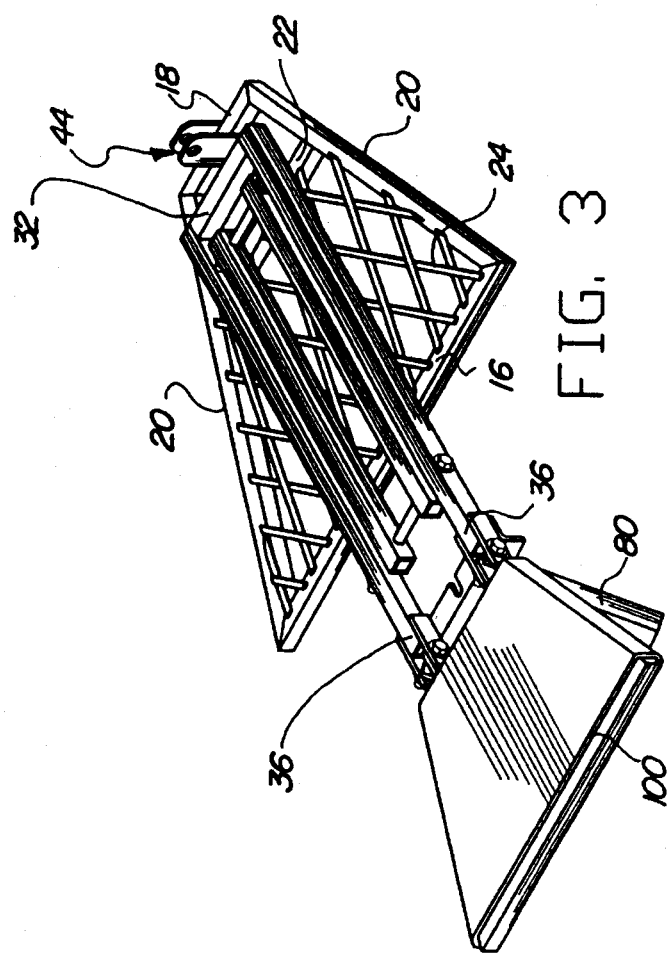
FIG. 3 is a perspective view of the present invention in a stowed configuration.
Figure 5:
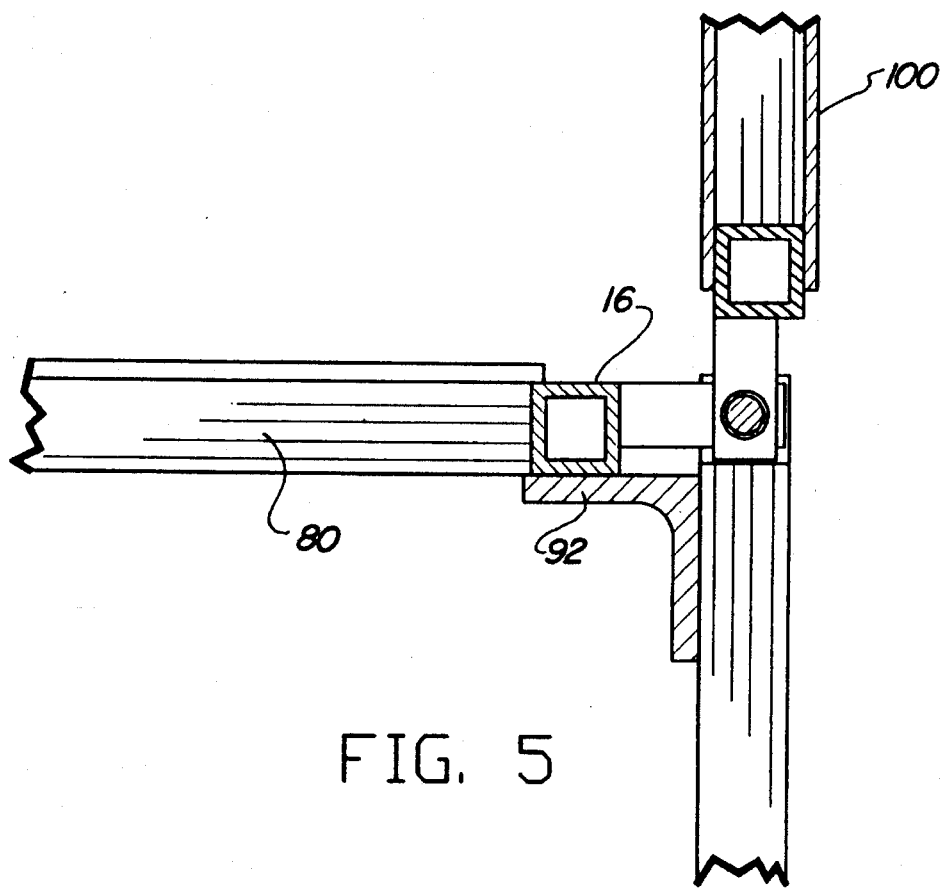
FIG. 5 is a cross-sectional view of the present invention depicting the coupling between the back leg, seat back, and a seat taken along the line 5—5 of FIG. 4.
Figure 6:
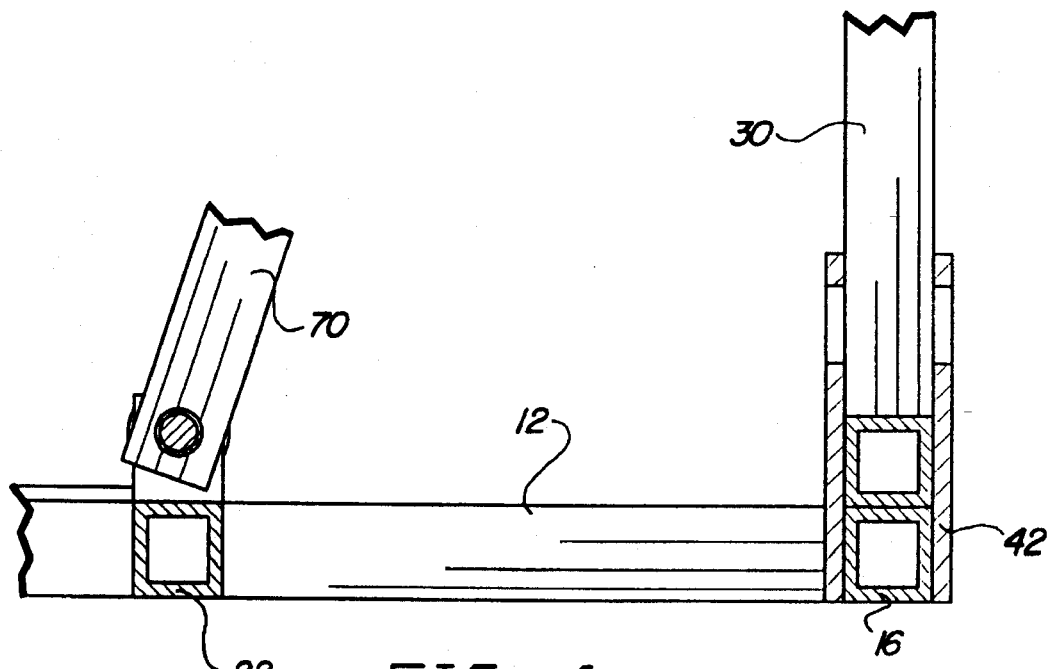
FIG. 6 is a cross-sectional view of the present invention taken along the line 6—6 of FIG. 4.
Figure 7:
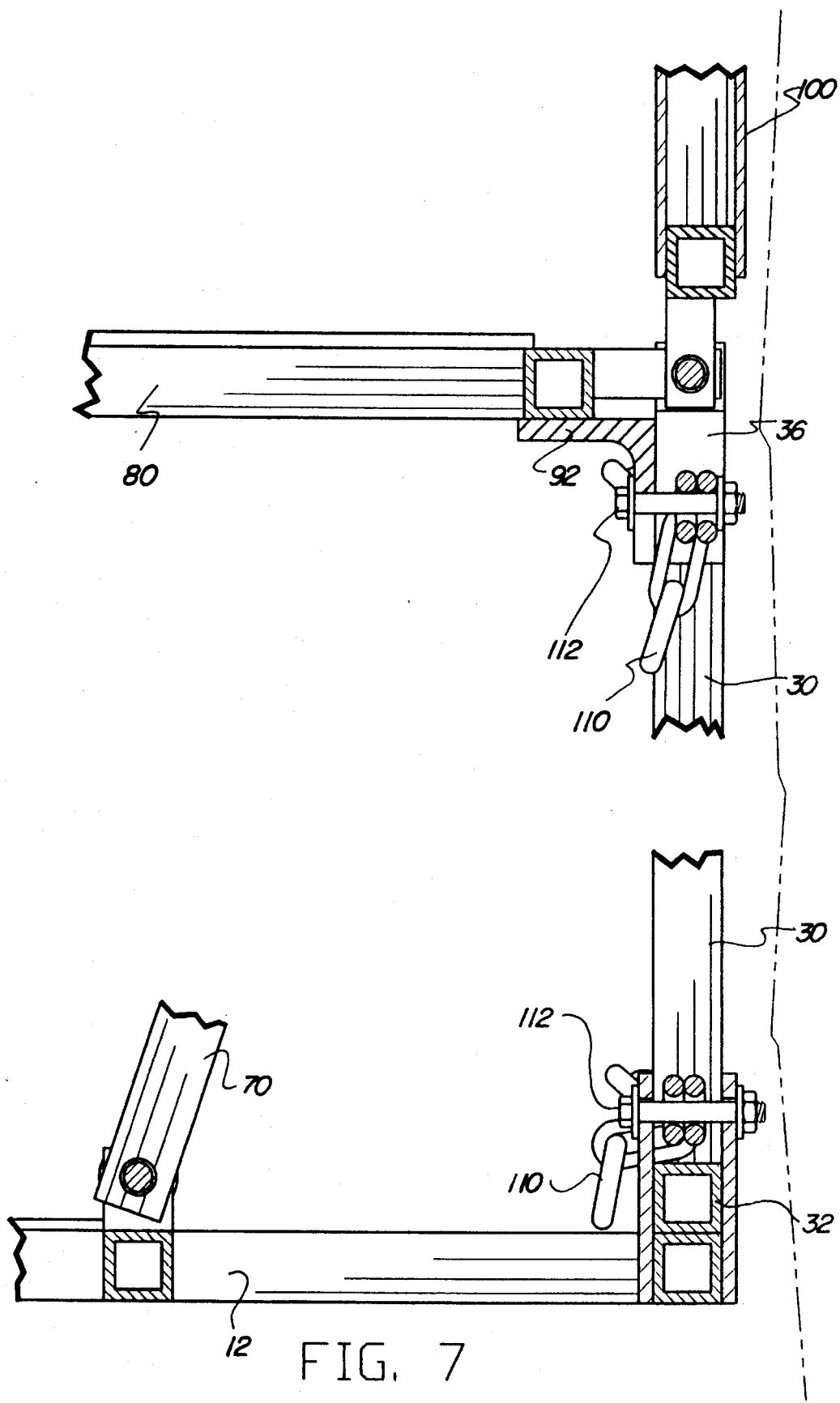
FIG. 7 is a cross-sectional view of the present invention depicting the coupling as shown previously in FIGS. 5 and 6 and further depicting a pair of chains with complementary wing nuts used for securing the back leg to a tree.

With reference now to the drawings, and in particular, to FIGS. 1 through 6 thereof, the preferred embodiment of the new and improved tree stand embodying the principles and concepts of the present invention and generally designated by the reference number 10 will be described.

Specifically, the present invention includes nine major components. The major components are foot rest, back leg, guide, lower pivot bolt, upper pivot bolt, front leg, seat, seat back, and chains. These components are interrelated to provide the intended function.

More specifically, it will be noted in the various Figures that the first major component is the foot rest 12. The foot rest is rigid and planar in structure. It is used for supporting a user thereon for hunting. The foot rest has a trapezoidal lower frame 14. The lower frame has opposed front and rear legs 16, 18 and opposed side legs 20 extended inwards from the front leg 16 to the rear leg 18. An intermediate leg 22 is disposed in parallel between the front leg and the rear leg and coupled to the side legs. The foot rest also includes a grate 24 disposed thereover for supporting a user yet allowing drainage therethrough.

The second major component is the back leg 30. The back leg is rigid in structure. It has a crossbar 32 with a pair of spaced and parallel rear support bars 34 extended therefrom. Each rear support bar is terminated remote from the crossbar at a tip end 36. In an operational configuration, the back leg is positioned vertically against a tree.

The third major component is the guide 40. The guide is rigid in structure. It is formed of two plates 42. Each plate is coupled to the rear leg 16 of the foot rest at the midpoint thereof. The two plates are extended upwards from the rear leg to form a holding space 44 therebetween. The holding space is used for receiving the crossbar 32 of the back leg therein. When the crossbar is disposed within the holding space in an operational configuration, the back leg is essentially positioned perpendicular to the footrest.

The fourth major component is the lower pivot bolt 50. The lower pivot bolt is rigid in structure. It is coupled in parallel with the intermediate leg 22 of the footrest. It is positioned at a location upwardly offset from the intermediate leg of the footrest.

The fifth major component is the upper pivot bolt 60. The upper pivot bolt is rigid in structure. It is coupled across the rear support bars 34 of the back leg. It is positioned at a location offset from the tip ends 36 of the back leg.

The sixth major component is the front leg 70. The front leg is rigid in structure. It has a pair of spaced and parallel front support bars 72. Each front support bar has a base end pivotally coupled to the lower pivot bolt 50 and a tip end extended therefrom and pivotally coupled to the upper pivot bolt 60. Given this pivotal coupling, the front leg 70 and the back leg 30 are upwardly orientable from the foot rest 12 in an operable configuration. The front leg and the back leg are also proximately orientable with the foot rest in a stowed configuration.

The seventh major component is the seat 80. The seat is rigid and planar in structure. The seat has a trapezoidal upper frame 82. The upper frame has opposed front and rear legs 84, 86 and opposed side legs 88. The side legs are extended inwardly from the front leg 84 to the rear leg 86. The upper frame also has a grate 90 disposed thereover for supporting a user and allowing drainage therethrough. The seat is pivotally coupled to the tip ends 36 of the back leg. Given this pivotable coupling, the seat 80 is perpendicularly orientable from the back leg 30 in an operational configuration. The seat is supported in this operational configuration with a pair of support angles 92 extended front the tip ends 36 of the back leg. The seat is also upwardly orientable in a generally planar configuration with the back leg in a stowed configuration. Thus, a user may position the seat in an operational configuration for sitting or position the seat in a stowed configuration for standing.

The eighth major component is the seat back 100. The seat back is rigid, planar, and trapezoidal in structure. The seat back has opposed upper and lower edges 102, 104 and opposed side edges 106. The side edges are extended inwards from the upper edge 102 to the lower edge 104. The seat back includes a layer of padding 108 disposed therearound. The lower edge of the seat back is pivotally coupled to the tip ends 36 of the back leg. Given this pivotal coupling, the seat back is upwardly orientable from the back leg 30 in an operational configuration for supporting a user's back when sitting. The seat back is also proximately orientable with the seat in a stowed configuration.

The ninth major component is the chains 110. The present invention includes a pair of chains. Each chain includes a plurality of rigid coupled links. The chains are used for coupling the back leg 30 to a tree. One chain is removably secured to the guide 40. When the chain is secured to the guide the cross bar 32 of the back leg 30 is fixed within the holding space 44 of the guide, thus securing the back leg and foot rest in an operable configuration. The other chain is removably secured to the rear leg at a location below the seat 80 at the tip ends 36 of the back leg 30. The chains are removably secured to the back leg with wing nuts 112.

Figure 8:
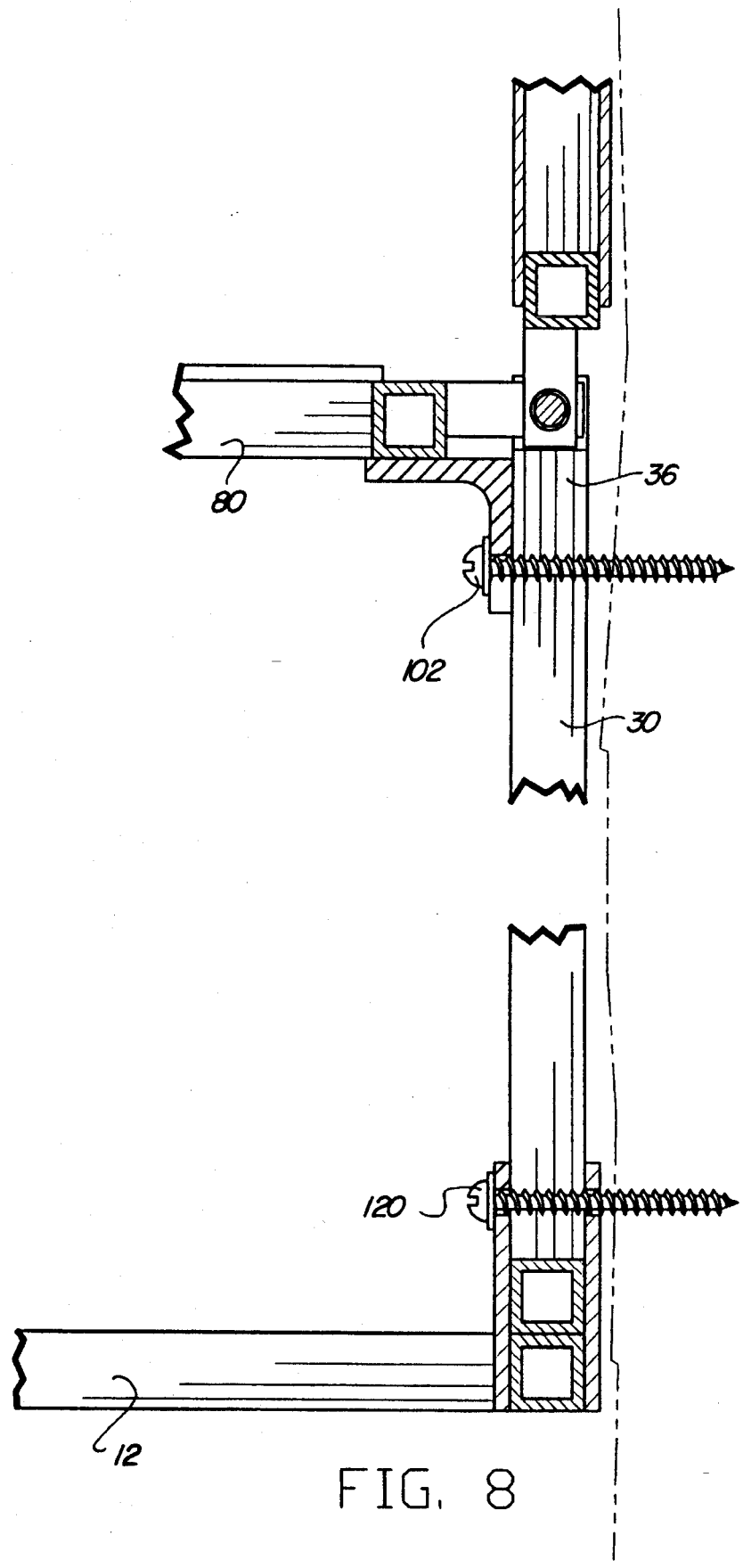
FIG. 8 is a cross-sectional view of the coupling previously depicted in FIGS. 5 and 6 and further depicting lag screws used for securing the back leg to a tree.

A second embodiment of the present invention is shown in FIG. 8 and includes substantially all of the components of the present invention but with a different means for coupling the back leg to a tree. In this embodiment, a plurality of lag screws 120 are used for securing the back leg 30 to a tree. Three lag screws may be utilized, with one lag screw being disposed through the guide and the other two lag screws each disposed through a separate tip end 36 of the back leg adjacent to the support angle 92.

Millions of people enjoy the sport of hunting. Being out in the wild to hunt is a revered pastime that is shared by many families. One of the requisite pieces of equipment is a tree stand. When using the tree stand, the hunter remains out of the animal's line of sight and the human scent is well above the forest floor.

Unfortunately, most tree stands are either unstable home built versions or they are prohibitively expensive when purchased from retail stores or catalogs. What is needed is a lightweight tree stand that is constructed from durable materials—one that fulfills the basic needs of the hunter. The present invention fulfills these requirements. It is a design that has been configured with a folding seat. A major advantage of the present invention is that the seat can be raised to increase the available room for standing to shoot.

The present invention is fabricated from steel tubing having a generally square cross-section. The foot rest has a trapezoidal shape, and is covered with expanded sheet metal to provide a lightweight yet strong supporting surface. The seat has a similar shape and also utilizes expanded sheet metal thereover. The footrest and seat are formed with this trapezoidal shape to avoid ancillary contact with branches and other foliage near a tree while simultaneously extending outwardly from the tree for providing and expanded supporting surface for use by a hunter. It is supported above the platform by front and back legs formed of steel tubing. Both the seat and foot rest can be folded to a vertical position when not in use. An advantage of the present invention over prior art tree stands is that it does not use support cables to hold the foot rest and seat in an operational configuration, thus allowing easier installation of the tree stand in areas thick with branches or brush. Furthermore, the lightweight tubular steel construction allows the present invention to be easily carried over long distances. These advantages make the present invention a practical replacement for less effective designs. The present invention can be attached to a tree by lag screws or by chains. Yet when it is attached to a tree, the seat and the foot rest are able to fold up. When the seat is folded up the hunter has more room when standing. The platform is then folded up when the hunter leaves the tree stand.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A tree stand for providing a stationary support for use by a hunter comprising, in combination:

a rigid and planar foot rest for supporting a user thereon, the foot rest having a trapezoidal frame with opposed front and rear legs, opposed side legs extended inwards from the front leg to the rear leg, an intermediate leg parallely disposed between the front and rear leg and coupled to the side legs, and a grate disposed thereover;

a rigid back leg having a cross bar with a pair of spaced and parallel rear support bars extended therefrom and with each rear support bar terminated at a tip end;

a rigid guide formed of two plates, each plate coupled to the rear leg of the footrest at the midpoint thereof and extended upwards therefrom to form a holding space therebetween for receiving the cross bar of the back leg therein;

a rigid lower pivot bolt coupled in parallel with the intermediate leg of the foot rest at a location upwardly offset therefrom;

a rigid upper pivot bolt coupled across the rear support bars of the back leg at a location offset from the tip ends thereof;

a rigid front leg having a pair spaced and parallel front support bars each having a base end pivotally coupled to the lower pivot bolt and a tip end pivotally coupled to the upper pivot bolt, the front leg and the back leg upwardly orientable from the foot rest in an operational configuration and proximately orientable therewith in a stowed configuration;

a rigid and planar seat, the seat having a trapezoidal frame with opposed front and rear legs, and opposed side legs extended inwardly from the front leg to the rear leg, and a grate disposed thereover and with the seat pivotally coupled to the tip ends of the back leg, the seat perpendicularly orientable from the back leg in an operational configuration and upwardly orientable therewith in a stowed configuration;

a rigid and planar seat back, the seat back having a trapezoidal frame with opposed upper and lower legs, opposed side legs extended inwards from the upper leg to the lower leg and with the lower legs pivotally coupled to the tip ends of the back leg, and a layer of padding disposed therearound, the seat back upwardly orientable from the back leg in an operational configuration and proximately orientable with the seat in a stowed configuration; and a pair of chains for coupling the back leg to a tree with one chain removably secured to the guide, thereby securing the cross bar of the rear leg within the holding space of the guide in an operable configuration, and the other chain removably secured to the rear leg at a location below the seat.

2. A tree stand comprising:

a foot rest;

a back leg having a base end and a tip end with the base end coupled with the foot rest in an operable configuration and decoupled therefrom in a stowed configuration;

a front leg having a base end pivotally coupled to the foot rest at a location offset from the coupling of the foot rest with the back leg and a tip end pivotally coupled to the back leg, the front leg and the back leg upwardly orientable from the foot rest in an operational configuration and proximately orientable therewith in a stowed configuration;

a seat pivotally coupled to the rear leg and generally perpendicularly orientable therefrom in an operational configuration and upwardly orientable therefrom in a stowed configuration;

a seat back pivotally coupled to the rear leg and generally upwardly orientable therefrom in an operational configuration and proximately orientable with the seat in a stowed configuration; and coupling means for coupling the back leg to a tree.

3. The tree stand as set forth in claim 2 wherein the coupling means is a plurality of chains securable to the back leg thereof.

4. The tree stand as set forth in claim 2 wherein the coupling means is a plurality of lag screws securable to the back leg thereof.

5. The tree stand as set forth in claim 2 wherein the foot rest, seat, and seat back are generally trapezoidal in structure.

6. The tree stand as set forth in claim 2 wherein the seat is padded.

* * * * *